July 21, 1953 H. B. WEINGARDEN 2,646,284

RECORD ADAPTER AND AUTOMATIC SPEED CHANGER

Filed Sept. 23, 1950

INVENTOR.
HERBERT WEINGARDEN.

BY

Robert A. Sloman

ATTORNEY.

Patented July 21, 1953 2,646,284

UNITED STATES PATENT OFFICE 2,646,284

RECORD ADAPTER AND AUTOMATIC SPEED CHANGER

Herbert B. Weingarden, Detroit, Mich.

Application September 23, 1950, Serial No. 186,369

2 Claims. (Cl. 274—9)

This invention relates to a record support or adaptor for the disc type record which is commonly used upon record players in conjunction with a tone arm and the required needle. More particularly the invention relates to an adaptor device for the new seven inch forty-five revolution per minute record to thereby adapt the same to standard equipment such as the holder and automatic adaptor in machines normally equipped for the automatic changing of the standard ten inch seventy-eight R. P. M. records.

The present adaptor disc for securing and supporting the seven inch forty-five R. P. M. record will fit into the standard ten inch record holder. The seven inch record having a central opening of one and one-half inches in diameter, the present adaptor device includes a portion having a central transverse opening of the standard $\frac{9}{32}$ inch. It is thus possible to insert the seven inch record into the present adaptor and make the same adaptable to fit any standard playing machine which is able to take the conventional ten inch record.

It is the object of the present invention to effect a reduction in the player tone arm weight so that it plays lighter on the forty-five R. P. M. seven inch record than on the standard ten inch seventy-eight R. P. M. record. This is accomplished automatically by recessing the present adaptor device so as to receive and position the seven inch record below the top surface of the adaptor so that more of the weight of the tone arm is taken up by the supporting spring.

It is the further object of the present invention to provide a needle track upon the adaptor surface which eventually leads to the starter grooves of the seven inch record within the adaptor without making any further adjustments to the machine.

It is the further object of this invention to provide an adaptor device which will hold the seven inch record so that the reverse side of its playing surface is not touched by any surface which would be harmful thereto.

It is the further object of this invention to provide an eccentric groove upon the surface of the adaptor which so controls the movements of the tone arm of the player so as to operate an electrical switch which will slow the turn-table motor down to the required speed whenever a seven inch forty-five R. P. M. record is played, it being understood that the present adaptor and the record therein may be intermixed with other ten inch records but that the slowing down will only occur when the tone arm and the needle engage the adaptor for such seven inch record.

It is the further object of this invention to provide a means for automatically switching the speed of rotation of the turntable driving motor which is controlled by an eccentric track on the surface of the adaptor. Such eccentric groove is adapted to operate the tone arm causing such movement thereof as will operate a switch either of the mechanical or electrical type for changing speeds of rotation of said turntable.

It is the still further object of the present invention to provide an adaptor construction whereby the seven inch record may be played on both sides alternately by merely turning over the adaptor device.

These and other objects will be seen from the following specification and claims in conjunction with the appended drawing in which—

Figures 1, 2, 3, 4, 5, 6, 7:
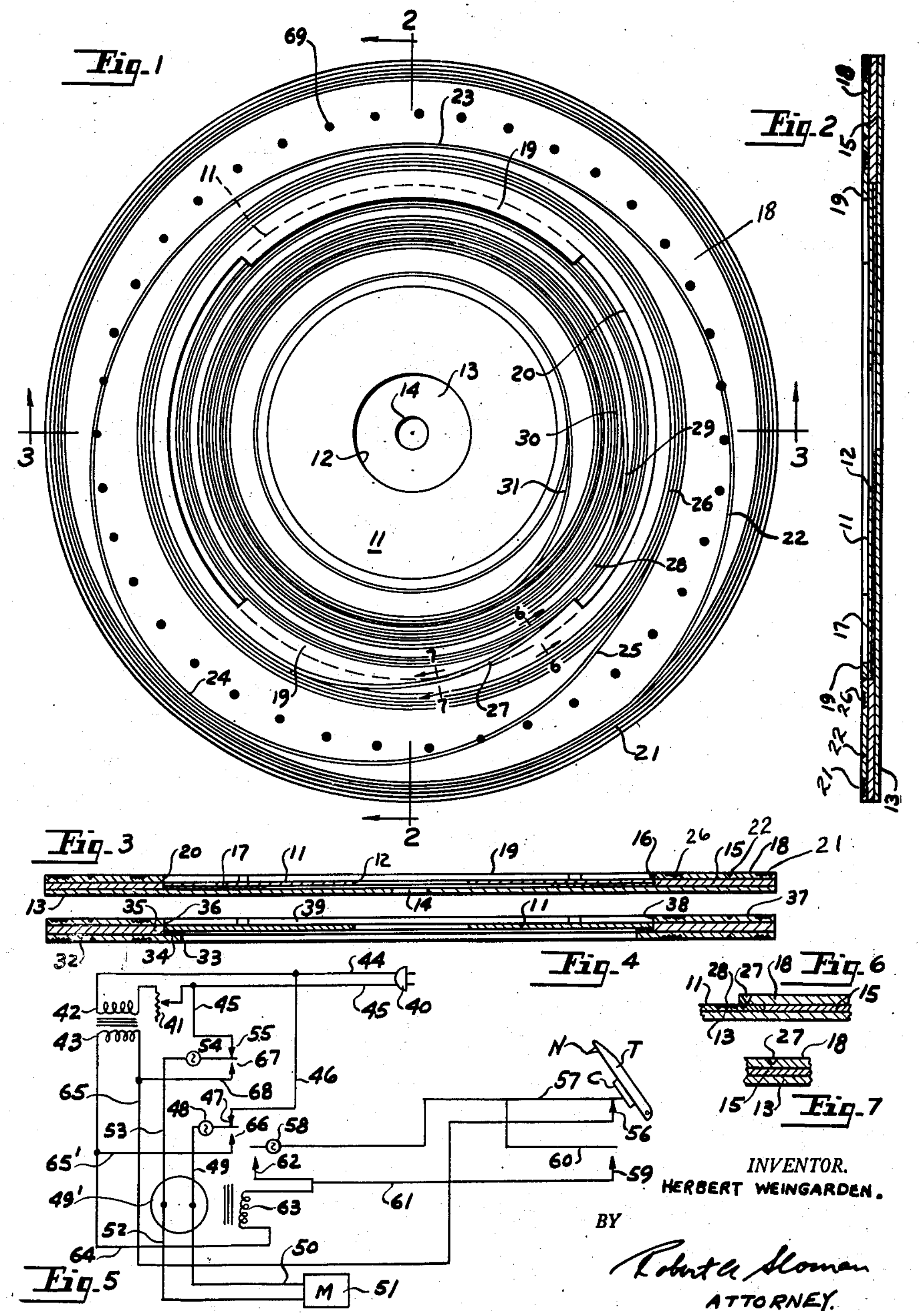
Fig. 1 is a plan view of the present adaptor with record inserted.
Fig. 2 is a section on line 2—2 of Fig. 1.
Fig. 3 is a section on line 3—3 of Fig. 1.
Fig. 4 is a view similar to Fig. 3 but illustrating a slight variation in the adaptor construction.
Fig. 5 is a wiring diagram illustrating the mechanism for accomplishing automatic change of speed of the turntable motor under the control of the tone arm operated by the grooves of the present adaptor.
Fig. 6 is a section on line 6—6 of Fig. 1.
Fig. 7 is a section on line 7—7 of Fig. 1.

It will be understood that the above drawing illustrates merely a preferred embodiment of the invention and that other embodiments are contemplated within the scope of the claims hereafter set out.

Referring to the drawing the seven inch forty-five R. P. M. record 11 with central enlarged opening 12 is positioned within the adaptor construction shown in Fig. 1 of the drawing.

Said adaptor includes the relatively rigid metallic disc 13 which has a standard size nine thirty-second inch opening 14 at its central portion which will receive the upright conventional stem of the playing machine turntable.

The annular ring 15 preferably constructed of a plastic material, of the same outside diameter as disc 13, has an interior diameter defining the circular opening 16 which is of such size as to freely receive the seven inch record 11. It will be noted that there is provided a soft flexible annular ring 17 of flocking or other fabric which is positioned upon the top surface of the metallic disc 13 and provides a protective support for said seven inch record.

A second, preferably plastic, disc 18 is mounted and secured upon the ring 15, the latter being suitably secured to disc 15, and the outside diameter of the disc 18 coincides with the outside diameters of members 13 and 15. Furthermore the general interior diameter of the top disc 18 is the same substantially as the diameter of the record 11 defining the central opening 20 which receives said record. However it will be noted that a pair of oppositely arranged record hold-down lips 19 extend from the interior portion of the disc 18 as shown in Fig. 1 and are of general arcuate shape. It may be necessary to slightly flex the record 11 in order to insert the same within the opening 16 of disc 15 and under the lips 19.

The adaptor top surface 18 has formed therein a plurality of continuous starter grooves 21 which are initially engaged by the depending needle of the player tone arm and prevent the same from sliding across the record. The inner of said grooves 21 joins the eccentric groove 22 which has a portion at 23 of minimum radius and which thereafter continues to a subsequent portion of maximum radius as at 24. This eccentric groove joins the forty-five R. P. M. lead-in grooves 26 by the intermediate groove 25. The innermost of the lead-in grooves 26 extends through a portion of one of the hold-down lips 19, which portion is designated at 27.

It will be noted that the record 11 is positioned below the surface of the disc 18, and in order that there shall be a smooth non-bumping lead onto the starter grooves 28 of the seven inch record, the groove 27 is gradually and downwardly tapered as illustrated in Figs. 6 and 7. The groove 27 at its end is substantially through the thickness of the lip 19 so that the needle freely rides down into the starter groove 28 of the seven inch forty-five R. P. M. record 11.

The above described point 23 of eccentric groove 22 causes the tone arm to move to a certain position towards the center of the turntable to thereby pick up a contact point 59 hereafter described whereas the subsequent portion 24 of said eccentric groove causes a movement of the tone arm in the opposite direction so that the same engages and now closes the point contact 59 with respect to the lead 60 hereafter described in connection with Fig. 5.

It is thus the purpose of the eccentric groove 22 to thus cause momentary closing of the contact point 59 to momentarily energize the coil of a relay switch hereafter to be described. Said relay switch through certain other electrical mechanism is adapted to change the speed of rotation of the turntable motor 51 to correspond with the required speed such as forty-five R. P. M. for the seven inch record.

Again referring to Fig. 1 the starter grooves 28 terminate in the lead-in groove 29 going into the regular playing grooves 30 of the seven inch record. It will be noted that the playing grooves terminate in the central turn-off grooves 31 of minimum radius at the central portion of the record 11 and this causes such positioning of the tone arm that it will be automatically and in a conventional manner lifted from the surface of the record and returned to its initial outward position so that its needle may engage the starter grooves of either a ten inch record to be automatically substituted for the present adaptor device or for starter grooves such as grooves 21 of a second seven inch record adaptor device.

The present invention also includes the above-mentioned control through the eccentric groove 22—23—24 which, indirectly through the operation of the tone arm and certain other electrical switching mechanism, causes an automatic reduction of the speed of rotation of the turntable motor.

Normally the turntable motor 51 shown in Fig. 5 would be directly connected into a terminal strip within the player and would operate under 110 volts to obtain a seventy-eight R. P. M. for the conventional standard record. By the present invention it is necessary to effect an automatic reduction of the voltage to approximately 30 to 35 volts for example to thereby produce a decreased speed of rotation of the motor to thereby achieve the necessary forty-five R. P. M. for the seven inch record. In this connection it is contemplated that any other desired voltage condition may be obtained to thereby produce the desired speed of rotation of the aforesaid motor 51.

The reduction in voltage in the present instance is accomplished by a step down transformer associated with a rheostat 41, the primary being designated at 42 and the secondary of said transformer being designated at 43. Suitable relay mechanism is required whereby upon the closing of contact point 59 the relay mechanism will be energized switching the electrical circuit through the transformer.

As shown in Fig. 5 tone arm T, its needle N and the contactor C are diagrammatically illustrated and are associated with the control contact points 56 and 59. In the operation of the player the contact 56 engages the electrical lead 57 just as soon as the needle engages the starter grooves 21 of the present adaptor or a similar groove in the conventional ten inch record.

Assuming the conventional record is being played the electrical circuit through the motor 51 includes the plug 40 connecting 110 volt source, lead 44, lead 46, contact 47, switch 48 and lead 49 to the receptacle 49'. Joined to said receptacle are the two motor leads 50 and 52 with the circuit being completed through lead 53, switch 54, contact 55 and lead 45 back to the plug 40.

This is the normal circuit if the ten inch record is played and this is also the normal circuit which energizes turntable motor 51 with the needle N riding in the starter grooves 21 of the adaptor 18.

As the needle rides in the eccentric groove 22—23—24 the above described reversal of position of the tone arm T takes place to effect a temporary engagement of the contact point 59 with the lead 60, to thereby initially energize a relay switch mechanism, and which has the effect of closing the electrical circuit in the secondary coil 43 of the transformer.

The electrical circuit will then be as follows: lead 65 through contact point 56, through lead 57 and contact 58, and due to the magnetic action of the relay coil 63 switch 58 will engage the contact 62, and thence through relay coil 63, lead 64 and back to the secondary 43 of the transformer.

Contact point 59 is momentarily in engagement with lead 60 but this is long enough to energize relay coil 63 which will hold contact 58 closed relative to switch 62 after which said relay coil is self energized.

This is apparent as the contact 59 again is opened but electrical power from the secondary 43 travels through the lead 65, contact point 56, lead 57 and contact point 58 which is closed relative to switch 62, with the circuit completed through relay coil 63 and lead 64. At the same time relay coil 63 reverses switches 48 and 54 from the position shown in Fig. 5 with 48 now engaging the pole 66 and with 54 engaging the pole 67. The electrical circuit to the motor 51 is now through the relay circuit and current flows through lead 68 from the secondary, through pole 67, switch 54 to the receptacle 49', through leads 52 and 50 to and from the motor 51, through lead 49, switch 48 and pole 66 and lead 65' back to the secondary winding 43 of the transformer.

When the needle on the tone arm T reaches the cut-off grooves 31 contact 56 is opened and this causes a deenergization of the relay coil 63 so that the contacts 58, 48 and 54 automatically return to the position shown in Fig. 5 and at the same time the arm is thrown back to its rest position.

The present invention also includes the stroboscope, or series of spaced dots or circles 69 which are arranged in a circle as shown and are of such size and number that upon rotation of the present adaptor, the desired R. P. M. such as forty-five R. P. M. for a seven inch record, is automatically indicated. This is accomplished by a conventional stroboscope construction which requires the illumination of an infra-red or equivalent light so that at the predetermined speed of rotation the series of dots 69 will appear stationary.

Having described my invention reference should now be had to the claims which follow for determining the scope thereof.

I claim:

1. In combination with an automatic record changer and a playing machine having a turn-table, a driving motor therefor and a needle carrying tone arm; an electrical circuit joined to a power source and connected to said motor to energize the same for driving said turn-table at a pre-determined speed, a second electrical circuit including a step-down transformer with the primary connected to said power source, a double pole double throw relay switch including stationary switch contacts in said first and second circuits and movable contacts for alternately closing said first and second circuits, the secondary of said transformer being connected through a pair of said stationary switch contacts to said motor, a magnetic control coil in said second circuit adapted to operate said movable contacts for switching energization of said motor from said first circuit to said second circuit whereby said motor driven turn-table is rotated at a reduced speed, a stationary contact connected with said coil, and a contactor on said tone arm connected through said second circuit with said secondary, said contactor being momentarily engageable with said coil contact for energizing said magnetic control coil, said coil rendering said relay switch self-energizing for maintaining said second circuit closed.

2. In combination with an automatic record changer and a playing machine having a turn-table, a driving motor therefor and a needle carrying tone arm; and electrical circuits joined to a power source and connected to said motor to energize the same for driving said turn-table at a pre-determined speed, a second electrical circuit including a step-down transformer with the primary connected to said power source, a double pole double throw relay switch including stationary switch contacts in said first and second circuits and movable contacts for alternately closing said first and second circuits, the secondary of said transformer being connected through a pair of said stationary switch contacts to said motor, a magnetic control coil in said second circuit adapted to operate said movable contacts for switching energization of said motor from said first circuit to said second circuit whereby said motor driven turn-table is rotated at a reduced speed, a stationary contact connected with said coil, a contactor on said tone arm connected through said second circuit with said secondary, said contactor being momentarily engageable with said coil contact for energizing said magnetic control coil, said coil rendering said relay switch self-energizing for maintaining said second circuit closed, a record adaptor for a reduced diameter record positionable upon said turn-table and cooperable with said record changer and tone arm, and having an eccentric needle groove cooperable with said needle carrying tone arm to effect a momentary switching movement of said tone arm contactor to energize said magnetic coil.

HERBERT B. WEINGARDEN.

References Cited in the file of this patent

UNITED STATES PATENTS

| Number | Name | Date |
|---|---|---|
| 1,683,469 | Kauffman | Sept. 4, 1928 |
| 1,885,415 | Collison | Nov. 1, 1932 |
| 1,933,305 | Belt | Oct. 31, 1933 |
| 2,027,426 | Hammond | Jan. 14, 1936 |
| 2,113,401 | Goldsmith | Apr. 5, 1938 |
| 2,285,139 | Andres | June 2, 1942 |
| 2,318,654 | Wissner | May 11, 1943 |
| 2,353,370 | Sears | July 11, 1944 |
| 2,416,583 | Hartley | Feb. 25, 1947 |
| 2,436,529 | Pressley | Feb. 24, 1948 |
| 2,526,188 | Andres | Oct. 17, 1950 |